(12) United States Patent
Gore

(10) Patent No.: US 7,869,029 B1
(45) Date of Patent: Jan. 11, 2011

(54) MULTIPLE WAVELENGTH LIGHT COLLIMATOR AND MONITOR

(75) Inventor: Warren J. Gore, Foster City, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1321 days.

(21) Appl. No.: 11/398,733

(22) Filed: Mar. 31, 2006

(51) Int. Cl.
*G01J 3/00* (2006.01)
(52) U.S. Cl. .................................................... 356/300
(58) Field of Classification Search .................. 356/300
See application file for complete search history.

(56) References Cited

U.S. PATENT DOCUMENTS 4,164,373 A * 8/1979 Schuss et al. ............... 356/316
5,371,358 A * 12/1994 Chang et al. ............... 250/226
5,412,200 A * 5/1995 Rhoads .................... 250/201.9

OTHER PUBLICATIONS

Carbary et al. "Ultraviolet and visible imaging and spectrographic imaging instrument", Jul. 1, 1994, Applied Optics, vol. 33 No. 19, pp. 4201-4213.*
Tomasko et al. "The Descent Imager/Spectral Radiometer (DISR) Aboard Huygens", 1997, European Space Agency, 1177, pp. 109-138.*
Rieser et al. "Luminscence dating: A new high sensitivity TL/OSL emission spectrometer", 1999, Quarternary Geochronology, vol. 18, pp. 311-315.*

* cited by examiner

*Primary Examiner*—Gregory J. Toatley, Jr.
*Assistant Examiner*—Kara E Geisel
(74) *Attorney, Agent, or Firm*—John F. Schipper; Robert M. Padilla

(57) ABSTRACT

An optical system for receiving and collimating light and for transporting and processing light received in each of N wavelength ranges, including near-ultraviolet, visible, near-infrared and mid-infrared wavelengths, to determine a fraction of light received, and associated dark current, in each wavelength range in each of a sequence of time intervals.

6 Claims, 4 Drawing Sheets

Shortwave Spectroradiometer (SWS) Block Diagram

Shortwave Spectroradiometer (SWS) Block Diagram

US 7,869,029 B1

MULTIPLE WAVELENGTH LIGHT COLLIMATOR AND MONITOR

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to collimation and monitoring of light intensity in a plurality of wavelength intervals.

BACKGROUND OF THE INVENTION

Determination of useful spectrum of a light source that is spaced apart from the measuring instrument must take account of contributions from the ultraviolet, visible, near-infrared, mid-infrared and (optionally) far-infrared, must take account of variation of these contributions with time, and must provide compensation for contributions from dark current, which would be sensed when access to the light source is interrupted. Where possible, the light sensor should use components that are already known to be reliable and robust.

What is needed is a light collimator and light intensity monitoring system that simultaneously receives and processes light in three or more overlapping or isolated wavelength intervals and estimates dark current within each interval. Preferably, the system should have a relatively small light acceptance angle, to discriminate against and prevent processing of light from a source outside a small acceptance region. Preferably, the system should permit comparison of light received in specified wavelength intervals with a dark current signal associated with each wavelength interval, for normalization purposes. Preferably, the system should maximize use of reliable, off-the-shelf components in order to maximize interchangeability and data reproducibility.

SUMMARY OF THE INVENTION

These needs are met by the invention, which provides a light collimation system that processes and monitors light intensity received in each of two or more overlapping or isolated wavelength intervals. Light is received at a light collector and collimator having a relatively small light acceptance angle, in an angular range of 1-2°. This light is received at N subsets (N≧2) of non-identical optical fibers, with each fiber's optical characteristics being chosen for optimal transmission of light in a specified wavelength interval. The system includes a shutter having a controllable duty cycle, to allow comparison of system dark current (system-off) with system-on current within each wavelength interval, for reference and correction purposes. An electronics system receives and analyzes the transmitted light in each wavelength interval, in the system-off and system-on conditions. Dark current is analyzed over different time intervals, as well as different wavelength intervals, to identify possible anomalies in the light source and/or light processing electronics. A plurality of wavelength intervals is analyzed, for total radiance and for dark current effects.

DESCRIPTION OF BEST MODES OF THE INVENTION

Figure 1:
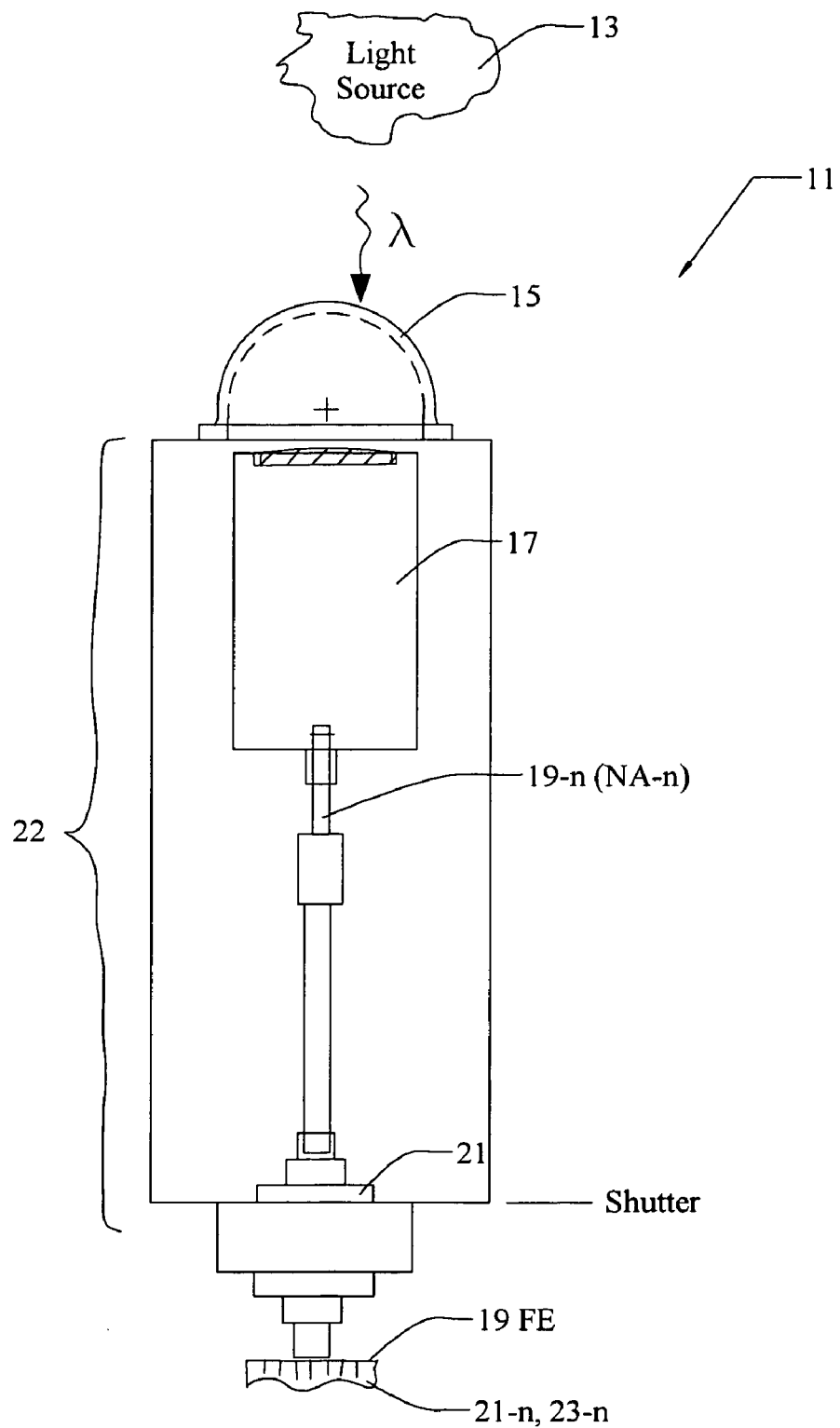
FIG. 1 schematically illustrates an embodiment of the system.

FIG. 1 schematically illustrates an embodiment 11 of the system and a possible light source. Light ($\lambda$) from a source 13 is received at a light collector dome 15 and is passed through a collimator 17 having a small controllable field of view (FOV) of 1-2°, with an aperture diameter AD≈22 mm and a focal length FL≈50 mm in this embodiment. The collimated light is received at a first end 19FE of each of a plurality of optical fibers 19-$n$ ($n=1, \ldots, N$; $N \geq 2$), where each fiber has a relatively small numerical aperture NA-$n$ that serves to further limit the acceptance angle of the received light. Preferably, but not mandatorily, the numerical aperture NA-$n$ for each of the optical fibers 19-$n$ is approximately the same so that the light acceptance angle for each of the specified wavelength intervals is approximately the same.

The collimated and angle-restricted light in each specified wavelength interval, $\lambda_{n,L} \leq \lambda \leq \lambda_{n,U}$, is passed through a shutter 21 having a controllable duty cycle DC. When the shutter 21 is open, light in each of the specified wavelength intervals is received and the associated light intensity $I(\lambda_{n,L} \leq \lambda \leq \lambda_{n,U}; n; \Delta t1)$ is collected by a light collector 22 and is processed by an accumulated light intensity monitor and electronics module 23-$n$ for that wavelength interval ($n$) for a first selected time interval of length $\Delta t1$. When the shutter 21 is closed, the light monitor and electronics module 23-$n$ senses a dark current light intensity value $I(\text{off}; n; \Delta t2)$ for that wavelength interval, over a second selected time interval of length $\Delta t2$. A normalized, system-off light intensity $I(\text{off}; n; \Delta t2)/\Delta t2$ is statistically compared with a normalized, system-on light intensity $I(\lambda_{n,L} \leq \lambda \leq \lambda_{n,U}; n; \Delta t1)/\Delta t1$ to determine a corrected, system-on light intensity $I(\lambda_{n,L} \leq \lambda \leq \lambda_{n,U}; n; \Delta t1; \text{corr})$ for each of the specified wavelength intervals $\lambda_{n,L} \leq \lambda \leq \lambda_{n,U}$.

A Zeiss monolithic spectrometer, with 8-12 nm resolution, is preferred for combined near-ultraviolet, visible and near-infrared wavelength sensing, in a wavelength range of 300 nm $\leq \lambda \leq$ 12200 nm. Preferably, a data acquisition system and control system 25 using a PC-104 format and USB interface for the data collection, using an Ethernet data collection interface.

Two or more corrected, system-on light intensities $I(\lambda_{n,L} \leq \lambda \leq \lambda_{n,U}; n; \Delta t1(m); \text{corr})$ ($m=1, \ldots, M; M \geq 2$) can be compared for different, preferably non-overlapping time intervals to identify possible anomalies in the light source and/or drift or other anomalies in the light monitor and electronics module 23-$n$ for one or more of the specified wavelength intervals. For example, if only one of the specified wavelength intervals, $\lambda_{n1,L} \leq \lambda \leq \lambda_{n1,U}$, manifests anomalous behavior over time, this may indicate that the light monitor and electronics module 23-$n1$ is experiencing substantial drift in time, relative to all other light monitor and electronics modules 23-$n$ ($n \neq n1$). Alternatively, if substantially all of the specified wavelength intervals manifest anomalous behavior, this may indicate that the light source is primarily responsible for the observed anomalies.

Figure 2:
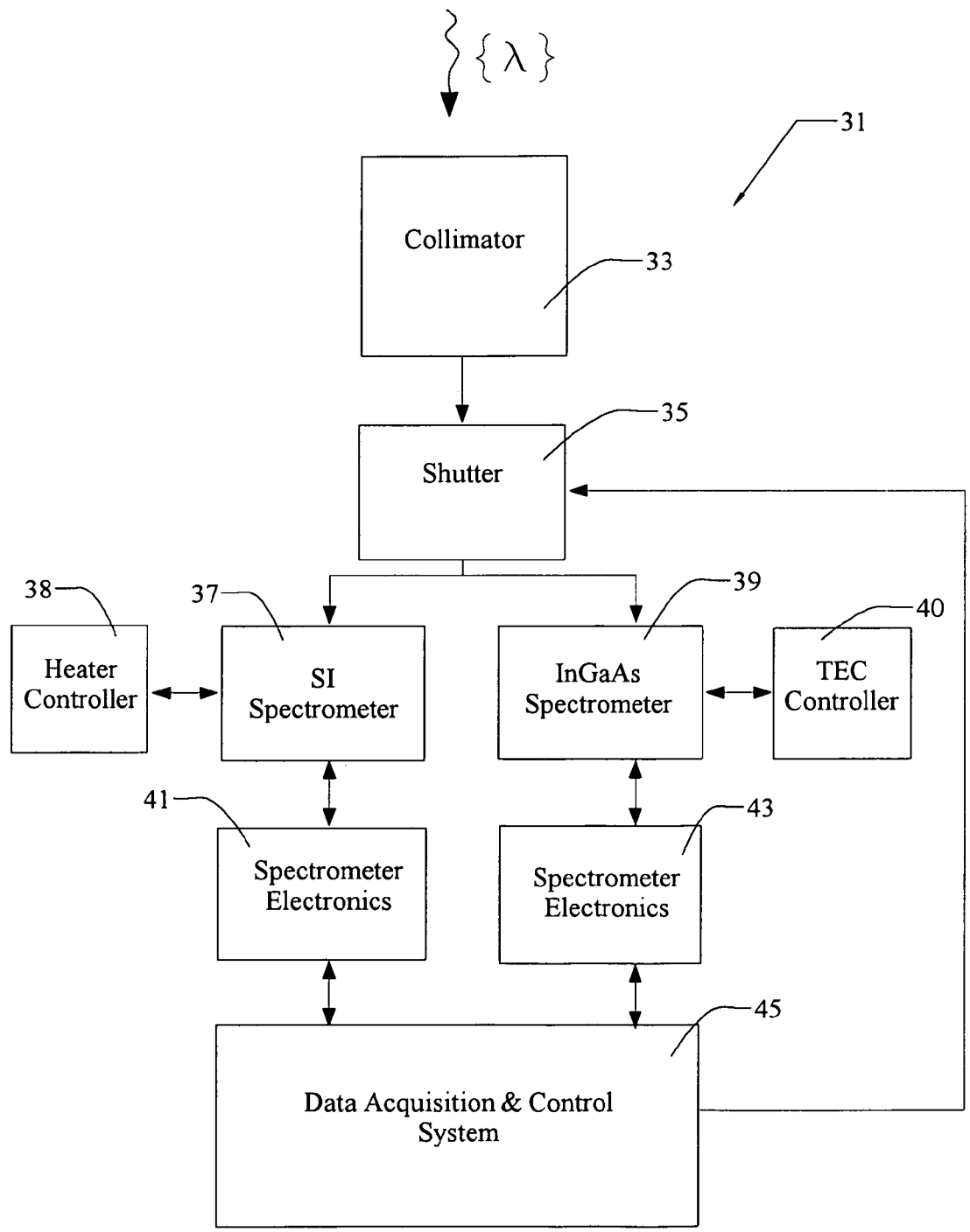
FIG. 2 is a block diagram of different components of the system.

FIG. 2 is a block diagram illustrating the main components and their interoperability for the system 31. Light, including a collection of wavelengths $\{\lambda\}$, is received at a light collimator 33, and the collimated light is passed through a shutter mechanism 35, which has a selected duty cycle and activation frequency $f_{ac}$ that can be at most 5 Hz or any other suitable lower frequency. A first portion of the light admitted by the shutter 35 is passed to a Si spectrometer 37, with associated heater-controller 38, to determine the wavelength distribution of the light in the near-uv, visible and near-infrared portion of the spectrum (e.g., 300 nm$\leq\lambda\leq$1100 nm). A second portion of the light admitted by the shutter 35 is passed through an InGaAs spectrometer 39, with associated TEC controller 40, to determine the wavelength distribution (overlapping) of the light in the mid-infrared and (optionally) far-infrared portion of the spectrum (e.g., 1050 nm$\leq\lambda\leq$2200 nm). A signal representing the near-uv/visible/near-infrared wavelength distribution sensed by the Si spectrometer 37 is received and processed by a first spectrometer module 41, and the processed signal(s) is received by a data acquisition and control sub-system 45). A signal representing the mid-infrared/far-infrared wavelength distribution sensed by the InGaAs spectrometer 39 is received and processed by a second spectrometer module 43, and the processed signal(s) is received by the data acquisition and control sub-system 45.

Figure 3:
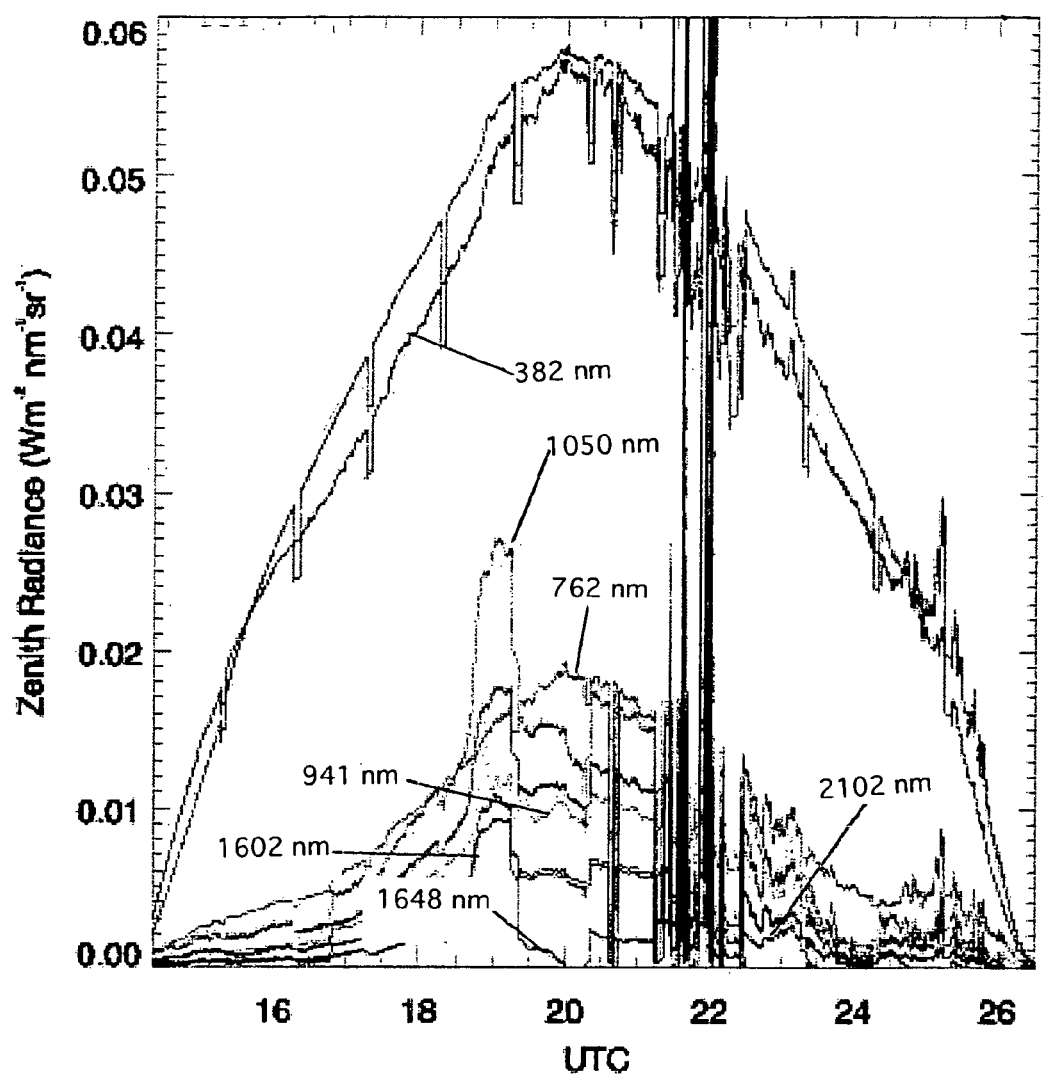
FIGS. 3 and 4 graphically illustrate zenith radiance as a function of observation time and wavelength on a selected day, using an embodiment of the invention.

Among other signals, the data acquisition and control sub-system 45 can provide a graphical representation of the wavelength distribution received and sensed, in units of zenith radiance (Watt-meter$^2$/nm/ster) of the sun, by the system on 18 Mar. 2006 for the UTC time interval from 14 hours through 26 hours (daylight), at the selected wavelengths $\lambda$=382 nm, 505 nm, 762 nm, 941 nm, 1050 nm, 1199 nm, 1602 nm, 1648 nm and 2102 nm, as illustrated in FIG. 3. The uppermost curve is total radiance received over all wavelengths in the combined sensitive intervals, including a "dark period" of five consecutive minutes per hour when the shutter 35 was closed. The dark current sensed by the system during each dark period, as a function of the indicated wavelengths, is subtracted from the current sensed during the "light period" (shutter open) to provide a dark current-compensated radiance value at each of a selected group of wavelengths. Note that light received and sensed in several near-infrared wavelength ranges has a pronounced maximum during a time interval 18.5$\leq$t$\leq$19.5 (UTC hours).

Figure 4:
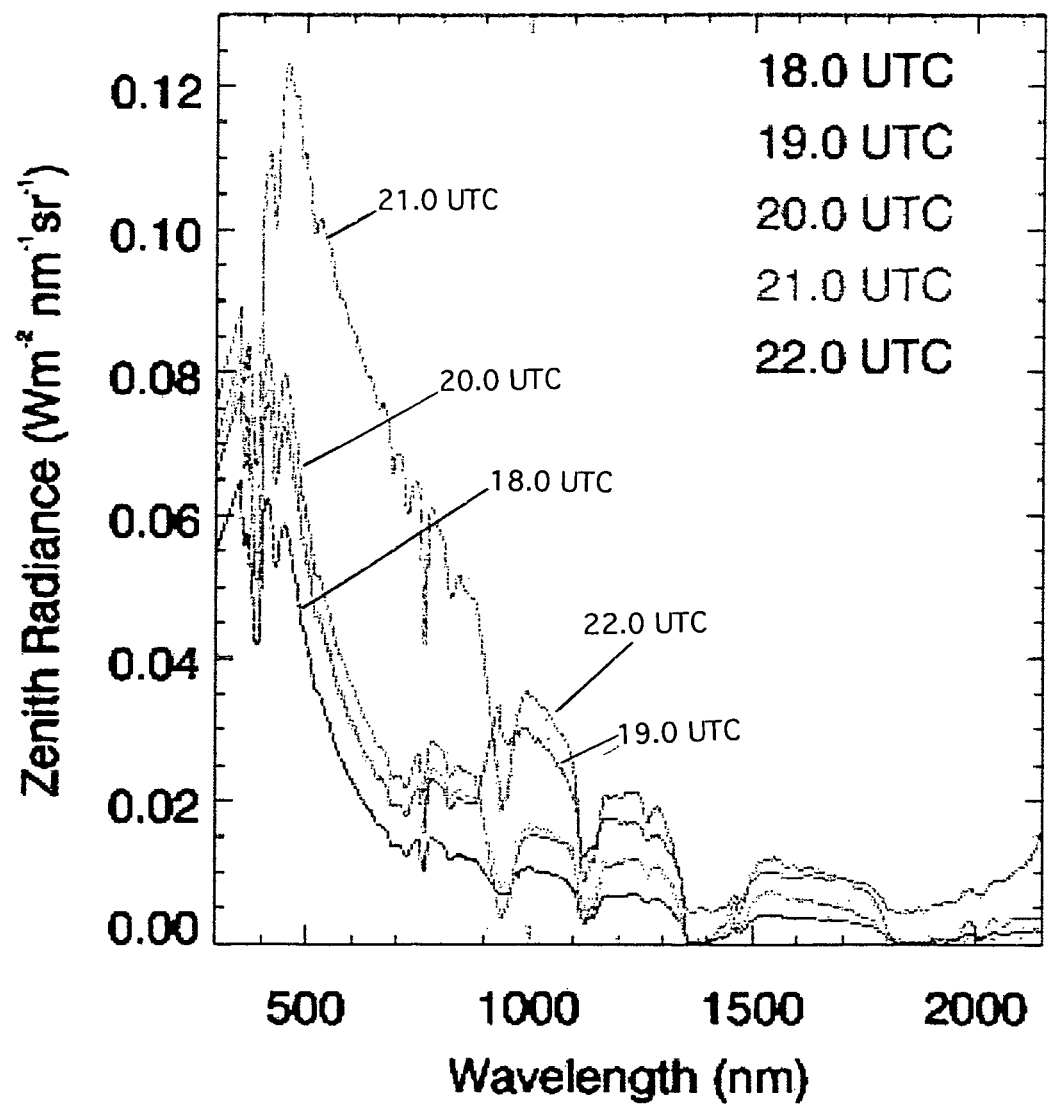

FIG. 4 graphically illustrates the zenith radiance, as a function of wavelength in a range 300 nm$\leq\lambda\leq$2200 nm, at each of the UTC times 18.0, 19.0, 20.0, 21.0 and 22.0 hours, indicating a pronounced maximum associated with the UTC time 21.0 hours. Most of the contribution to zenith radiance from the sun arise from the visible and near-uv wavelengths.

What is claimed is:

1. A system for receiving and processing light from one or more light sources, the system comprising:
    a light collector and collimator that receives light from one or more light sources over a solid angle of substantially 2$\pi$ steradians in N wavelength ranges (N$\geq$3), covering near-ultraviolet, visible, near-infrared and mid-infrared wavelengths and numbered n=1, . . . , N, and that aligns the received light within a collimation angle of no more than about 2°;
    a light shutter mechanism that admits light received from the collector and collimator during a first time interval and blocks admission of light during a second time interval, to provide an estimate of a dark current within each of the N wavelength intervals;
    a light transporter, having N transporter components, numbered n=1, . . . , N, where transporter component number n transports light in the wavelength range number n substantially optimally for that wavelength range; and
    a light processor that receives and separately processes light transported in each of the N wavelength ranges during the first time interval and during the second time interval, estimates a fraction of total light intensity received for each of the N wavelength ranges, and estimates a dark current component in each of the N wavelength ranges from signals sensed during each of the first and second time intervals.

2. The system of claim 1, wherein said first and second time intervals are non-overlapping.

3. The system of claim 1, wherein said signal sensed during said second time interval is subtracted from said signal sensed during said first time interval, for at least one of said N wavelength ranges.

4. The system of claim 1, wherein said light processor receives and processes light in said near-ultraviolet, visible and near-infrared wavelength ranges and receives and separately processes light in said near-infrared and mid-infrared wavelength ranges.

5. The system of claim 1, wherein said light transporter comprises N optical fibers, with each fiber being optimized for transport of light in one of said N wavelength ranges.

6. The system of claim 1, wherein said light processor provides an estimate of light received in each of said N wavelength intervals for a sequence of time intervals that are included in said first time interval.

* * * * *